United States Patent [19]

Knudson et al.

[11] Patent Number: 4,879,160

[45] Date of Patent: Nov. 7, 1989

[54] EDGE STABILIZED WOOD COMPOSITE PANEL

[75] Inventors: Robert M. Knudson, Coquitlam; Hubert Ehrenfellner, Surrey, both of Canada

[73] Assignee: MacMillan Bloedel Limited

[21] Appl. No.: 219,308

[22] Filed: Jul. 15, 1988

[51] Int. Cl.[4] ............ B32B 23/02

[52] U.S. Cl. ............ 428/192; 428/332; 52/309.13; 52/309.20; 52/630; 52/782

[58] Field of Search ............ 52/309.13, 309.20, 630, 52/782; 428/192, 332, 425.1, 541

[56] References Cited

U.S. PATENT DOCUMENTS

| | | | |
|---|---|---|---|
| 1,672,097 | 6/1928 | Schumacher | 428/192 |
| 2,378,244 | 6/1945 | Pfenning | 428/192 |
| 2,619,681 | 12/1952 | Baker et al. | 428/192 |
| 3,173,460 | 3/1965 | Hann . | |
| 3,887,406 | 6/1975 | Gwynne | 428/192 |
| 4,363,883 | 12/1982 | Gagliani et al. | 428/192 |

FOREIGN PATENT DOCUMENTS

| | | |
|---|---|---|
| 1213707 | 11/1986 | Canada . |
| 2433476 | 1/1976 | Denmark . |

*Primary Examiner*—Ellis P. Robinson
*Assistant Examiner*—P. J. Ryan

[57] ABSTRACT

A composite wood panel of improved edge swell characteristics is provided by applying stabilizing additive to the exposed surface of a layup of wood particles (wafers) from which the panel is to be formed by consolidation as the layup is being produced. The additive is applied only in selected areas one adjacent each side edge of the layup so that the resultant product has in effect stabilizing additive through the thickness of the resultant panel at each side edge. Preferably the additive will be applied as stripes at spaced depths through the layup and these stripes will extend inwardly from each side edge a distance sufficient to stabilize the panel against edge swelling. The preferred additive is an isocyanate type resin adhesive.

8 Claims, 3 Drawing Sheets

EDGE STABILIZED WOOD COMPOSITE PANEL

FIELD OF THE INVENTION

The present invention relates to a stabilized board product, more particularly the present invention relates to an edge stabilized board incorporating a stabilizing additive in the areas adjacent each side edge of the board.

BACKGROUND OF THE PRESENT INVENTION

Waferboards are sometimes used as a sub-floor and overlayed with some form of decorative cover such as carpet, hardwood, etc. One of the major problems in using panels such as wood particle board (waferboard) is that on significant wetting the boards tend to expand non-uniformly i.e. the edges of the board tend to swell more than the central portion and produce a ridge having a relatively clear line of demarkation between the swelled edge (ridge) and the remainder of the panel. It is believed this edge swell is caused primarily because the edges of the board absorb more water. Furthermore the side edges are normally tongue and grooved so that swelling prior to assembly of the boards to form the sub-floor can result in difficulties and possibly even damage to the boards when fitting the tongues and grooves.

Techniques have been devised to stabilize wafer board product and to reduce springback after wetting. One such process is described in U.S. Pat. No. 32,173,460 issued Mar. 16, 1965 to Hann wherein the whole board is contained within fixed boundaries, i.e. prevented from significant expansion and exposed to steam thereby causing internal swelling and promotion of plastic flow which in effect stabilized the product.

Canadian Pat. Nos. 1,213,707 and 1,215,510 issued Nov. 12, 1986 and Dec. 23, 1986 respectively to Hsu disclosed other treatments for improving the dimensionally stability of a composite board. The earlier of the two patents discloses a secondary heat treatment wherein the finished board is subjected to an increased temperature for a pre-determined period of time while the latter patent discloses a system of presteaming the chips prior to forming the layup and making the board so that the moisture content of the chip is significantly higher and the chips are more plastic when they are being formed into a panel.

Steam pressing has also been found to improve the dimensional stability of a panel, i.e. when the panel is consolidated under pressure and at the same time steam is applied the resultant product tends to have greater dimensional stability than when a similar panel is produced without the addition of steam.

BRIEF DESCRIPTION OF THE PRESENT INVENTION

It is an object of the present invention to provide a composite wood particle (wafer) panel having improved edge swell and to a method and apparatus for producing such a composite panel.

Broadly, the present invention relates to a wood composite panel formed from wood particles coated with a suitable adhesive and bonded together under heat and pressure conditions, said panel including laterally spaced areas having a stability enhancing additive incorporated therein, one of said areas being positioned adjacent each lateral side edge of the panel, each said area extending substantially the full length of said panel and having a width determined by the spacing between a lateral inside edge and a lateral outside edge of each said area, said lateral outside edge of each said area being positioned substantially at its respective adjacent panel lateral side edge and each said stripe having a width of at least one inch.

Preferably each area will be formed by a plurality of stripes of additive positioned at spaced levels through the thickness of said panel.

Preferably said stabilizing additive will comprise isocyanate resin preferably in an amount equal to 2 to 10 percent of the weight of the particles in the volume of the panel defined by the length of the panel, thickness of the panel and width of the stripes.

Further stripes may be applied across the ends of the panel to stabilize the end edge of the panels.

The present invention also relates to a method and apparatus for producing a wood composite panel from wood particles coated with resin comprising forming a layup of said coated wood particles in a former, applying a stabilizing additive intermediate the outer face surfaces of said layup as said layup is being formed and at laterally spaced locations positions one adjacent each lateral edge of said layup.

Preferably said additive will be added as stripes at different levels through the thickness of the layup.

Preferably the outer edge of said stripes relative to said layup will be spaced inwardly from the outer lateral edge of said layup by a distance substantially equal to the width of trim expected to be removed from a panel formed from said layup.

In some cases it may be desirable to apply stabilizing additive to the end faces of each panel. This may be done by applying it directly to the finished panel for example by spraying or painting or alternatively by intermittently in proper timed relationship applying transverse strips of additive extending transversely of said layup to provide a plurality of overlying transverse stripes of additive spaced at different depths through the thickness of the layup and located in that area of the layup that will form the transverse end edge of the finished panel.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
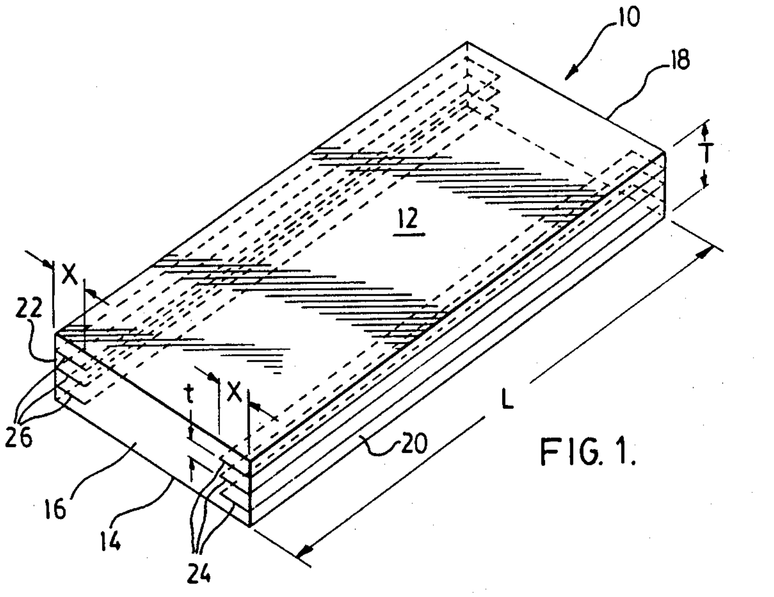
FIG. 1 is an isometric illustration of one form of the invention including a plurality of stripes of stabilizing additive at different depths through the thickness of the panel and located adjacent each lateral edge of the panel.

A typical composite panel 10 is formed of discrete wood particles held together by adhesive, generally wood wafers held together by phenol-formaldehyde resin adhesive consolidated under heat and pressure. The board or panel has two main or face surfaces (an upper and lower surface in the illustration) 12 and 14, a pair of end faces 16 and 18 and a pair of side faces 20 and 22. The spacing between the main faces 12 and 14 defines the thickness of the panel. Spacing between the side faces 20 and 22 will be referred to as the width of the panel and the spacing between the faces 16 and 18 will be defined as the length of the panel.

The present invention differs from prior art composite panels by incorporating a plurality of stripes 24 and 26 extending substantially the full length of the board and located adjacent the side edges 20 and 22 of the board respectively. While these stripes 24 and 26 have been shown as substantially straight stripes, it will be apparent that they are simply a coating applied to the exposed surface of the mat as the mat forming the layup is being laid and thus will diffuse to a certain extent through the underlying mat, i.e. thickness of each stripe will vary depending on degree of diffusion, but the stripes 24 and 26 have been shown as straight lines to simplify the illustration. These stripes 24 or 26 have widths, i.e. extend in from the side edges 20 and 22 respectively forward the centre of the panel 10 a distance indicated by the dimension x which will normally be at least about 1 inch (25 millimeters) and preferably at least 1½ inches (38 millimeters) and for practical purposes normally will only be sufficiently wide to adequately reduce the edge swell of the panel. For practical purposes this normally will not exceed about 3 inches (75 mm).

Figure 3:
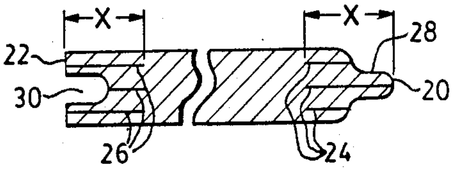
FIG. 3 is a section through a tongue and groove panel formed the panel of FIG. 1 illustrating the position of the stripes of additive.

In some cases the side edges 22 and 20 are machined to provide a tongue 28 and a groove 30 (see FIG. 3). The stripes 24 and 26 will extend inwardly relative to the side edges 20 and 22, i.e. have a width x significantly wider than the extent of the tongue 28 or depth of the groove 30 from the edge of the panel.

These stripes 24 and 26 extend substantially the full length of the panel and are spaced different depths throughout the panel. The number of such stripes will depend on the thickness T of the panel and may vary depending on the thickness of the wafers used and the additive to be applied. Preferably the stripes will not be spaced a distance t greater than about 3/16 of an inch (5 millimeters) in the finished panel when an isocyanates resin is used as the additive, significantly wider spacing of the stripes may significantly reduce the effectiveness of the invention to reduce edge swell. The stripes 24 and 26 adjacent the top and bottom, i.e. stripes 24 and 26 closest to the faces 12 and 14, preferably will be spaced from their respective adjacent face 12 or 14 by a distance less than the distance t equivalent to the spacing between superimposed stripes.

Figure 1A:
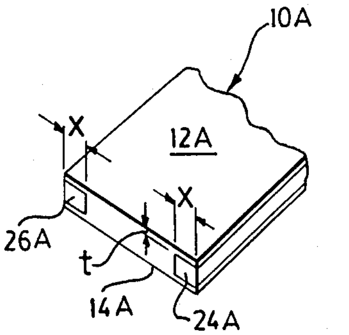
FIG. 1A is a partial isometric illustrating the panel with the additive applied as single relatively thick band.

In place of the discrete stripes 24 and 26 the area of the board 10 occupied by these stripes may have additive substantially throughout as indicated by the areas 24A and 26A in FIG. 1A.

Figure 2:
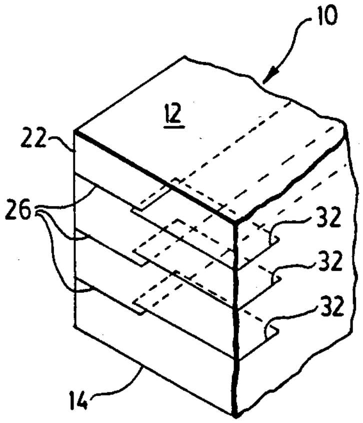
FIG. 2 is a partial end section showing stripes of additive extending across the end face of the panel.

The transverse end edges 16 and 18 are normally not subjected to the same problems as the side edges since there are no tongues or grooves formed on the transverse end edges and thus in many cases edges 16 and 18 do not require any treatment. Those cases where treatment is required these edges 16 and 18 may simply be coated with a suitable additive that diffuses into the end edges after the panel 10 is consolidated or as shown in FIG. 2 transverse stripes 32 may be provided at spaced depths across the end edge of the panels. When stripes 32 are used across each transverse end of the panel, the depth and spacing of these stripes will be essentially the same as for the stripes 24 and 26.

Figure 4:
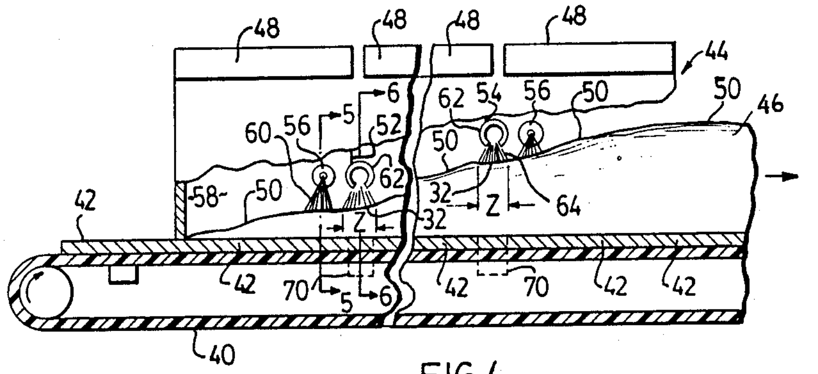
FIG. 4 is a partial section schematically illustrating a former incorporating stabilizing additive applicators in accordance with one form of the present invention.

Referring now to FIG. 4 a schematic layout of one form of former is provided. In this arrangement a conveyor belt 40 carries cauls 42 through a former 44 that produces a layup 46 on the cauls 42 as they pass in end to end relationship through the former 44. The former 44 may be composed of a plurality of forming heads schematically indicated at 48 (4 have been shown but fewer or more may be used).

As the cauls 42 enter the former 44, e.g. under the first forming head 48 (at the extreme left of the former 44), the wood particles or wafers gradually build up as shown by the top surface 50 of the layup. The former 44 and forming heads 48 may be any suitable type of forming system and may include orienting means not shown. In the illustrated arrangement partitions such as the partitions 52 and 54 are interposed between adjacent forming heads 48.

Figure 5:
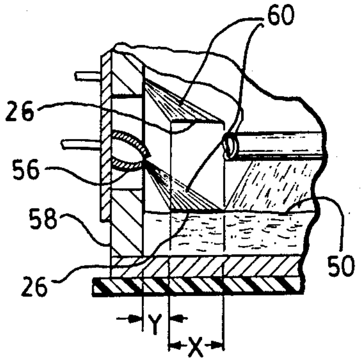
FIG. 5 is a section along the line of 5—5 of FIG. 4 illustrating the side edge applicators the application of side stripes to the layup.

Located within all or selected ones of the forming heads 48 are applicators 56 which in the illustrated arrangement are spaced discrete nozzles or sprayers adapted to spray a cone of additive onto the exposed surface 50 of the layup immediately adjacent the sprays. These applicators 56 extend through the side walls 58 (similar sprays will be provided on opposite sides of the former 44 to provide the stripes on each side of the layup) and each will be adapted to spray a cone or a flaring strip 60 of additive onto the adjacent exposed surface 50 to form a stripe 24 and 26 (see FIG. 5 which illustrates two strips 26 being formed). These strips 24 or 26 preferably have a width X as described above and are spaced from the side edge of the layup formed by the side walls 58 by a distance Y which substantially corresponds with the trim width to be trimmed from the sides of the panels after consolidation.

Each of the applicators (nozzles or sprayers) 56 operate substantially continuously so that the stripes 24 and 26 extend substantially continuously the full length of the panels being formed.

If desired, the discrete applicators 56 may be replaced with a continuous applicator, e.g. a sprayer that applies additive to the exposed surface 50 of the mat in the former 44 substantially along the full length of the surface 50 so that additive is substantially uniformly applied over the area indicated at 24A and 26A in FIG. 1A. In such an arrangement the continuous sprayer (not shown) will extend substantially the length the former 44 and will apply additive to the exposed surface of the mat or layup commencing when the mat has built up to a thickness of at least several particles (wafers) thickness and terminating when a similar thickness of mat is yet to be laid to complete the layup, so that the resulting volumes 24A and 26A are spaced from the surfaces 12A and 14A of the finished panel 10A (see FIG. 1A).

It is preferred to use discrete spraying heads 56 instead of a continuous spraying head since with a continuous spraying head the amount of material that may be applied per unit area is relatively small and control of the application of the additive becomes significantly more difficult.

Figure 6:
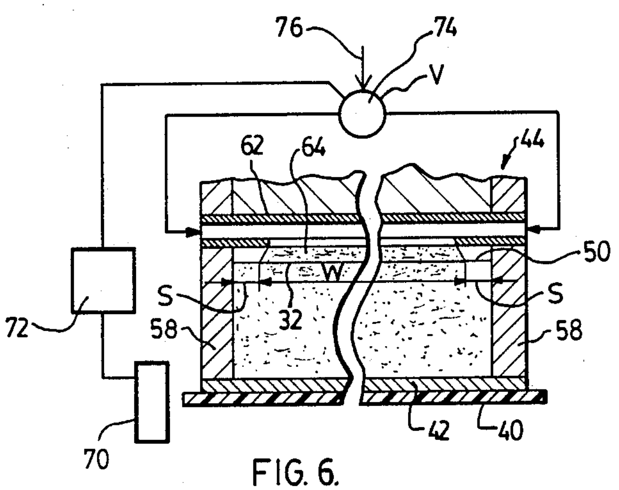
FIG. 6 is a section along the line 6—6 of FIG. 4 illustrating the application of an end stripe to the board.

To provide strips across the end edges such as the strips 32 shown in FIG. 2, suitable nozzles such as the nozzles 62 or 64 shown in FIG. 4 will be provided. These nozzles preferably will be positioned at the bottom edge of their respective partitions 52 and 54 forming the dividers between adjacent forming heads 48. Each of the nozzles 62 is formed with a slot 64 through which a spray 66 of additive is emitted. These slots 62 preferably apply additive across a width W of the mat (not the full width of the former 44) leaving areas each of a width S (FIG. 6) adjacent each of the side walls 58 that will not be covered by the stripes 32. The length Z (measured in the direction of movement of the mat through the former 44) of each stripe formed by the sprays 64 will be substantially twice the length of each of the stripes 32 in each panel (two end to end panels will be separated along the mid-line of length Z) and thus will normally be at least 2 inches although for practical purposes due to inaccuracies of precisely positioning and the amount of material lost through trimming etc., it is preferred to make these stripes formed by the sprays 62 at least about 3 inches, i.e. dimension Z will normally be about 3 inches. The dimension S on the other hand will normally be about equal to the distance Y plus X so that there is very little overlap.

It will be apparent that to position the stripes 32 at the ends of the caul which should match with the end edges of the panels being formed, it is necessary to activate the sprays 62 only for a short period of time commencing as the leading end of a caul approaches and terminating shortly after it passes from beneath the spray 62. The timing of the operation of the sprays 62 will determine the location of the stripes 32 and their length Z. This timing of operation of the sprays 62 is accomplished by means of sensors such as a sensor illustrated at 70 in FIGS. 4 and 6 which sense the approach the leading end of the caul and trigger the timer 72 to activate the valve 74 controlling the feed from line 76 into the opposite ends of the nozzle or spray element 62 (see FIG. 6).

In some cases the cauls may be longer than the panel to be formed, for example, twice the length of the panel to be formed and the valve 74 will have to be activated for a second period of time when the centre or mid-line of the caul passes under the spray 62 to provide a further set of stripes 32 in a position to coincide with the transverse ends of the two panels formed from the layup on the one caul.

Figure 7:
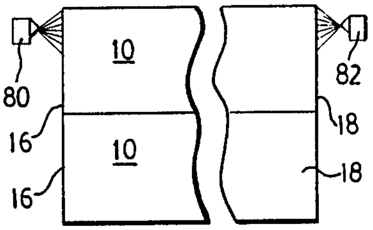
FIG. 7 is a schematic illustration of an application of additive to the end edges of finished panels.

As above indicated the stripes 32 are not necessarily essential. In some cases it may be desirable to apply a suitable resin or additive by spraying or painting the transverse end edges of the panels after consolidation. For example, as shown in FIG. 7, a plurality of panels 10 may be passed between a pair of spray heads 80 and 82 so that their end edges 16 and 18 are coated with a suitable additive that penetrates the end of the panels.

While the method of the present invention may be used with any suitable additive it has been found that isocyanate resins or isocyanate resins together with extra or added moisture are very effective in reducing edge swell.

To determine the amount of isocyanate resin necessary to attain the desired result, tests were made using an isocyanate level (over and above the normal resin present in the wafers) of 2, 4 and 6 percent based on the weight of the wafers in the volume of the layup coated with additive. Two percent was found to be slightly effective, four percent was adequate and six percent was even better. However for commercial purposes normally about 4 percent additive will be used.

Panels incorporating seven layers, i.e. stripes of isocyanate and other panels containing four layers of isocyanate both treated with a water based urethane sealer namely a commercial water based urethane sealer available from Associated Chemists were compared with spruce plywood and with a commercial waferboard product edge sealed using the same commercial edge sealer.

Figure 8:
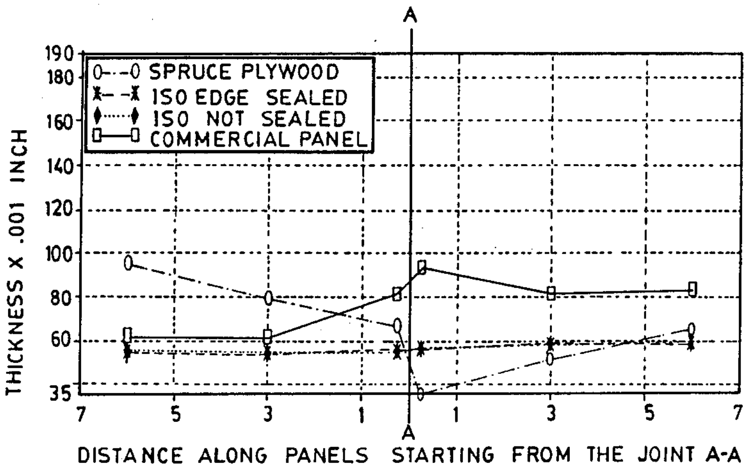
FIGS. 8 and 9 are graphic comparisons based on tests performed on panels with and without the present invention and measurement being made at the commencement of the tests and after 168 hours respectively.
Figure 9:
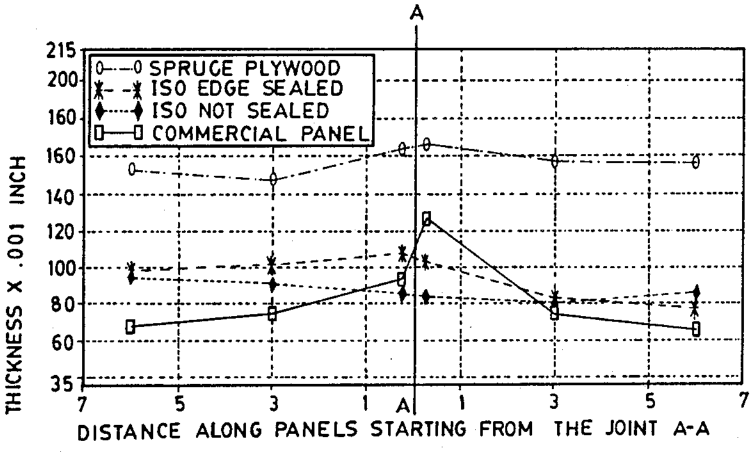

The results obtained after 168 hours wherein the boards were first soaked with a water spray for 24 hours then dried for 24 hours, soaked with a water spray again for 24 hours and then dried for 96 hours, (i.e. for a total treatment of 168 hours) are shown in FIG. 9 for a tongue and grooved joint between the panels. In this Figure and in FIG. 8, the edges of the panels abutted substantially along the line A—A, i.e. the end of the grooved panel was along the line A—A and the measurements were made at distances spaced from the line A—A as indicated, i.e. at about ¼, 3 inches and 6 inches from the line A—A as indicated by the horizontal scale.

The measurements for spruce plywood are indicated by the ovals, those for seven layers of isocyanate, i.e. seven stripes of isocyanate by a star, four layers of isocyanate by diamonds and the commercial waferboard by rectangles.

It will be apparent that the plywood is relatively flat at the joint after the 168 hours and has actually functioned to smooth out the joint. Immediately after assembly the thickness of the plywood in the immediate vicinity of the joint was less than the thickness of the plywood spaced from the joint (see FIG. 8).

It will be apparent that both of the panels treated in accordance with the present invention remained substantially flat in the area of the joint with no pronounced change in thickness or sudden change in thickness to provide a pronounced ridge. The commercial board as above described had a bit of a ridge when the tests were started but at the end of the 168 hour test, a very definite or pronounced ridge was formed in the immediate vicinity of the joint.

Ridges as illustrated in FIG. 9 for the commercial board generally require that the board be sanded after laying of the floor before applying the finished flooring. The other boards, namely the plywood board and the two boards constructed in accordance with the present invention do not have any reasonably sharp ridges or pronounced ridges in the immediate vicinity of the joint and thus will not require sanding. The spruce plywood, while it expanded significantly more than the waferboards, expanded substantially uniformly or to a degree that did not produce a significant ridge in the immediate vicinity of the joint. Such uniform expansion does not require sanding thus the plywood as well as the two boards constructed in accordance with the present invention permit the elimination of the sanding step in constructing a floor.

The above description has applied the additive (isocyanate resin) to the wood without additional moisture being added in the side areas (areas or volumes defined by the stripes). It has been found that if additional moisture is added to these side areas of the stripes 24 or 26, the dimensional stability of the edges of the panel or board are even more improved. The amount of moisture added however should not exceed a final moisture content in the area of isocyanate resin addition over about 12 percent (normally the moisture content of the layup will be in the order of about 4 percent).

In the above description the additive has been applied in stripes. It is also possible to apply the additive substantially continuously along substantially the full length of the former 44, i.e. the nozzle 56 will extend substantially continuously the full length of the former 48 and will apply additive as a substantially continuous stripe along the length of the exposed surface of the layup as it is being formed with the exception of the first few layers of wafers and the last few layers of wafers added to the layup 46. In the FIG. 1 the additive is substantially uniformly distributed throughout substantially the whole area to be reinforced, i.e. an area extending substantially from the top to the bottom of the full thickness of the panel (except for the first and last few layers of wafers to prevent the isocyanate resin from contacting and fouling the cauls) and inward from the edge of the panel by a distance x as described above. The disadvantage of this technique is that due to the limited amount of additive that is to be applied (4% isocyanate resin based on the weight of the wafers in the defined volume) the amount of spray per unit length must be very small and is difficult to apply and control. It is for this reason that stripes are preferred.

Having described the invention modifications will be evident to those skilled in the art without departing from the spirit of the invention as defined in the appended claims.

We claim:

1. A composite wood panel formed of wood particles coated with a adhesive and consolidated under elevated temperature and pressure conditions and having a pair of face surfaces, a pair of lateral side edges and a pair of transverse end edges, said panel including a pair of laterally spaced side portions distinct from a central portion of said panel between said spaced side portions in that each of said side portions has a stability enhancing additive incorporated substantially throughout its volume, said side portions extending substantially the full thickness of said panel as determined by spacing between said face surfaces in areas positioned one adjacent each lateral side edge of said panel, each said area having a lateral inside edge and a lateral outside edge, each said area extending substantially the full length of said panel between said pair of transverse end edges and each said area having a width determined by the spacing between its said lateral inside edge and its said lateral outside edge, said lateral outside edge of one of said areas being positioned substantially at one of said panel side edges and said lateral outside edge of the other of said areas being positioned substantially at the other of said panel lateral side edges and said width of each of said areas measured perpendicular to the said thickness being at least one inch.

2. A panel as defined in claim 1 wherein said additive is distributed throughout each said side portion in a plurality of stripes of additive, said stripes extending the length of said panel and being spaced apart so that they are at different levels in each said side portion relative to the thickness of said panel.

3. A panel as defined in claim 2 wherein spacings between adjacent said stripes are substantially the same.

4. A panel as defined in claim 3 wherein said stripes are at levels spaced by no more than 3/16 of an inch (5 mm).

5. A panel as defined in claim 1 wherein said stabilizing additive comprises isocyanate resin in each said side portion in an amount of 2 to 10 percent based on the weight of wood particles in said side portion.

6. A panel as defined in claim 2 wherein said stabilizing additive comprises isocynate resin in each said side portion in an amount of 2 to 10 percent based on the weight of wood particles in said side portion.

7. A panel as defined in claim 1 further comprising stripes of said additive at spaced levels through the thickness of said panel and extending transverse of said panel adjacent each said transverse end edge of said panel to stabilize said axial end edges of said panel.

8. A panel as defined in claim 4 further comprising a set of stripes of said additive at spaced levels through the thickness of said panel extending transverse of said panel adjacent each said transverse end edge of said panel to stabilize said axial end edges of said panel.

* * * * *